(12) United States Patent
Wu et al.

(10) Patent No.: US 12,444,024 B2
(45) Date of Patent: Oct. 14, 2025

(54) IMAGE FUSION DEVICE AND IMAGE FUSION PARALLEL OPTIMIZATION METHOD

(71) Applicant: Morning dew Creative Technical Co., Ltd., Taoyuan (TW)

(72) Inventors: Meng-Chien Wu, Hsinchu County (TW); Yuh-Show Tsai, Taoyuan (TW)

(73) Assignee: MORNING DEW CREATIVE TECHNICAL CO., LTD., Taoyuan (TW)

( * ) Notice: Subject to any disclaimer, the term of this patent is extended or adjusted under 35 U.S.C. 154(b) by 242 days.

(21) Appl. No.: 18/324,990

(22) Filed: May 28, 2023

(65) Prior Publication Data

US 2024/0331097 A1    Oct. 3, 2024

(30) Foreign Application Priority Data

Mar. 31, 2023   (TW) .................................. 112112388

(51) Int. Cl.
*G06T 5/50* (2006.01)
*G06T 7/50* (2017.01)
(Continued)

(52) U.S. Cl.
CPC .................. *G06T 5/50* (2013.01); *G06T 7/50* (2017.01); *G06T 7/90* (2017.01); *G06V 10/44* (2022.01);
(Continued)

(58) Field of Classification Search
CPC .... G06T 5/50; G06T 7/50; G06T 7/90; G06T 2207/10024; G06T 2207/20221; G06V 10/56; G06V 10/44; G06V 10/764
(Continued)

(56) References Cited

U.S. PATENT DOCUMENTS

| 9,905,196 B2 | 2/2018 | Pajak et al. |
| 2010/0014781 A1 | 1/2010 | Liu et al. |

(Continued)

FOREIGN PATENT DOCUMENTS

| CN | 112683923 A | 4/2021 |
| TW | 201005673 A | 2/2010 |
| TW | 202022802 A | 6/2020 |

OTHER PUBLICATIONS

G. Thoonen, Z. Mahmood, S. Peeters, and p. Scheunders, "Multisource classification of color and hyperspectral images using color attribute profiles and composite decision fusion," IEEE J. Sel. Topics Appl. Earth Observ. Remote Sens., vol. 5, No. 2, pp. 510-521, Apr. 2012.*

*Primary Examiner* — Jin Ge
(74) *Attorney, Agent, or Firm* — Li & Cai Intellectual Property Office

(57) ABSTRACT

An image fusion device and an image fusion parallel optimization method are provided. After a plurality of images are aligned to each other to form a superimposed image, the image fusion device filters the superimposed image to obtain a feature image. The image fusion device compares color depths of pixel points in each of a plurality of pixel regions of the feature image with each other to determine a maximum color depth of each of the plurality of pixel regions. When a relationship between the color depth of any one of the pixel points and the maximum color depth in each of the plurality of pixel regions does not meet a preset relationship, the image fusion device adjusts the color depth of the one of the pixel points according to the maximum color depth. The image fusion device generates a fused image according to the adjusted feature image.

8 Claims, 8 Drawing Sheets

(51) Int. Cl.
   *G06T 7/90*      (2017.01)
   *G06V 10/44*     (2022.01)
   *G06V 10/56*     (2022.01)
   *G06V 10/764*    (2022.01)

(52) U.S. Cl.
   CPC ............ *G06V 10/56* (2022.01); *G06V 10/764* (2022.01); *G06T 2207/10024* (2013.01); *G06T 2207/20221* (2013.01)

(58) Field of Classification Search
   USPC ........................................................ 345/629
   See application file for complete search history.

(56) References Cited

U.S. PATENT DOCUMENTS

| | | | |
|---|---|---|---|
| 2023/0064963 A1* | 3/2023 | Shang | G06V 20/64 |
| 2023/0252637 A1* | 8/2023 | Xu | G06V 10/771 |
| | | | 382/173 |

\* cited by examiner

IMAGE FUSION DEVICE AND IMAGE FUSION PARALLEL OPTIMIZATION METHOD

CROSS-REFERENCE TO RELATED PATENT APPLICATION

This application claims the benefit of priority to Taiwan Patent Application No. 112112388, filed on Mar. 31, 2023. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to an image fusion device, and more particularly to an image fusion device and an image fusion parallel optimization method that are applicable to a medical device.

BACKGROUND OF THE DISCLOSURE

In recent years, medical capsules, such as capsule endoscopes, have been widely used in the medical field. After the medical capsule is swallowed into a human body, the medical capsule sequentially flows through a plurality of body parts inside the human body. At the same time, the medical capsule captures a plurality of images inside the plurality of body parts (such as organs, tissues and so on) of the human body.

However, the medical capsules such as the capsule endoscopes cannot capture the plurality of images of the same one of the body parts of the human body respectively under different colored lights inside the body parts of the human body. Furthermore, the images captured by the medical capsules such as the capsule endoscopes are blurred images. However, medical personnel can only accurately diagnose the health of the human body based on a clear image. Thus, the plurality of images captured by the medical capsules must be further fused to form the clear image by a system, which requires a long period of time. Therefore, the medical personnel cannot instantly obtain the clear image for immediate and accurate diagnosis of human health.

SUMMARY OF THE DISCLOSURE

In response to the above-referenced technical inadequacies, the present disclosure provides an image fusion device. The image fusion device includes an image feature analyzing component, an image color identifying component, a maximum depth comparing component, a pixel depth analyzing component and an image fusion processing component. The image feature analyzing component is configured to convert a superimposed image into a feature image after a plurality of images of a same scene are captured respectively under different colored light beams and then aligned with each other to form the superimposed image. The image color identifying component is configured to read and identify colors of a plurality of pixel points in a plurality of pixel regions of the feature image. The maximum depth comparing component is connected to the image color identifying component. The maximum depth comparing component is configured to compare color depths of the plurality of pixel points in each of the plurality of pixel regions of the feature image with each other. The maximum depth comparing component is configured to determine a largest one of the color depths of the plurality of pixel points that are classified in a same one of a plurality of color tones in each of the plurality of pixel regions, as a maximum color depth of the same one of the plurality of color tones in each of the plurality of pixel regions of the feature image. The pixel depth analyzing component is connected to the maximum depth comparing component. The pixel depth analyzing component is configured to analyze a relationship between the color depth of each of the plurality of pixel points and the maximum color depth that are classified in the same one of the plurality of color tones in each of the plurality of pixel regions of the feature image. The image fusion processing component is connected to the pixel depth analyzing component. The image fusion processing component is configured to determine whether or not to adjust the color depth of each of the plurality of pixel points of the feature image, according to the relationship between the color depth of each of the plurality of pixel points and the maximum color depth that are classified in the same one of the plurality of color tones in each of the plurality of pixel regions of the feature image. When the relationship between the color depth of any one of the plurality of pixel points and the maximum color depth that are classified in the same one of the plurality of color tones in a same one of the plurality of pixel regions of the feature image does not meet a preset relationship, the image fusion processing component adjusts the color depth of the one of the plurality of pixel points according to the maximum color depth. The image fusion processing component generates the fusion image according to the feature image on which all of the plurality of pixel regions are adjusted.

In addition, the present disclosure provides an image fusion parallel optimization method. The image fusion parallel optimization method includes the following steps: obtaining a superimposed image, wherein a plurality of images of a same scene are captured respectively under different colored light beams and then aligned with each other to form the superimposed image; converting the superimposed image into a feature image; reading and identifying colors of a plurality of pixel points in a plurality of pixel regions of the feature image; comparing color depths of the plurality of pixel points in each of the plurality of pixel regions of the feature image with each other; determining a largest one of the color depths of the plurality of pixel points that are classified in a same one of a plurality of color tones in each of the plurality of pixel regions, as a maximum color depth of the same one of the plurality of color tones in each of the plurality of pixel regions of the feature image; analyzing a relationship between the color depth of each of the plurality of pixel points and the maximum color depth that are classified in the same one of the plurality of color tones in each of the plurality of pixel regions of the feature image; determining whether or not to adjust the color depth of each of the plurality of pixel points of the feature image, according to the relationship between the color depth of each of the plurality of pixel points and the maximum color depth that are classified in the same one of the plurality of color tones in each of the plurality of pixel regions of the feature image; and determining whether or not the relationship between the color depth of any one of the plurality of pixel points and the maximum color depth that are classified in the same one of the plurality of color tones in a same one of the plurality of pixel regions of the feature image meets a preset relationship, in response to determining that the relationship meets the preset relationship, not adjusting the color depth of the one of the plurality of pixel points, in response to determining that the relationship does not meet the preset relationship, adjusting the color depth of the one of the plurality of pixel points according to the maximum color depth that is classified in the same one of the plurality of color tones with the color depth of the one of the plurality of pixel points in the same one of the plurality of pixel regions, and generating the fusion image according to the feature image on which the color depths of all of the plurality of pixel regions are adjusted.

In conclusion, the present disclosure provides the image fusion device and the image fusion parallel optimization method. In the image fusion parallel optimization method of the present disclosure, the image fusion device of the present disclosure fuses the plurality of images of a scene such as a same body part of a human body that are captured under different lights to generate the clear image that is similar to the scene. As a result, practicability of the image is more effectively improved for subsequent applications, for example, an accuracy of medical diagnosis applications.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
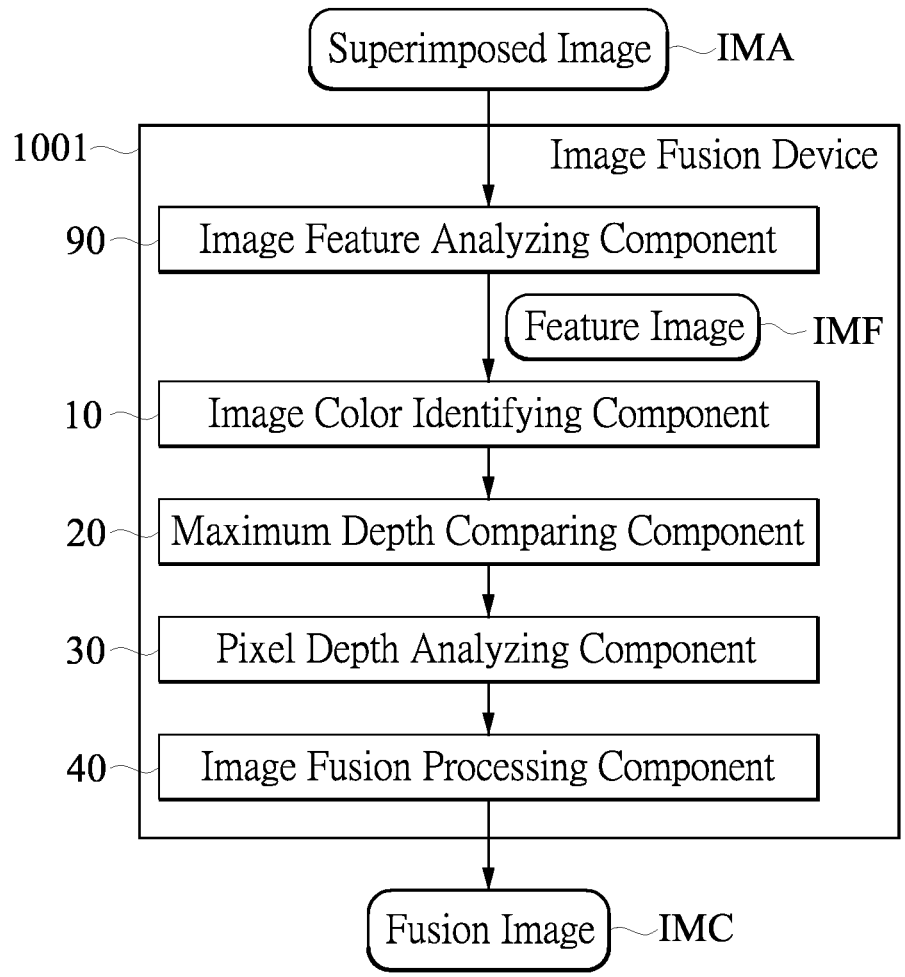
FIG. 1 is a block diagram of an image fusion device according to a first embodiment of the preset disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

Figure 2:
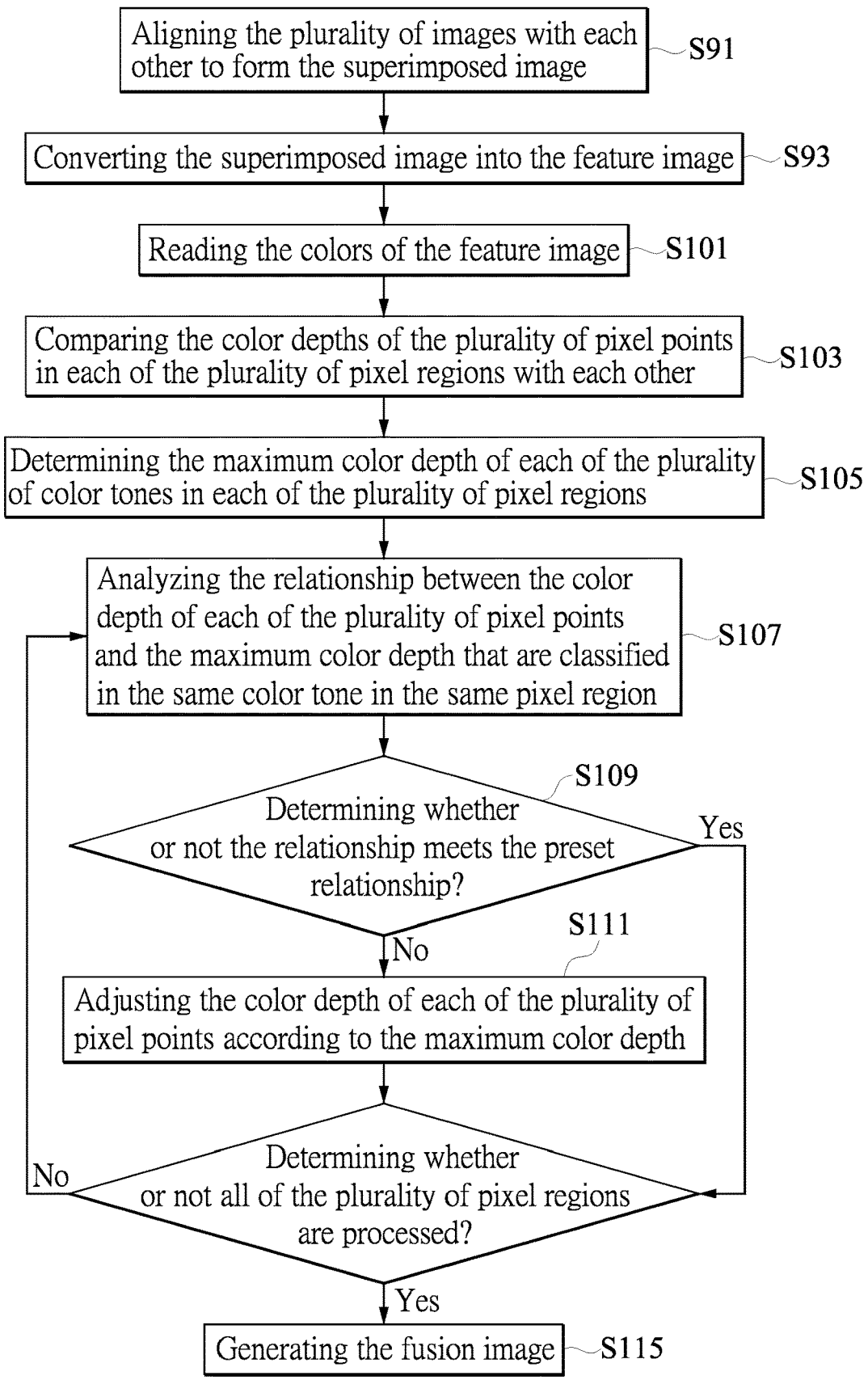
FIG. 2 is a flowchart diagram of an image fusion parallel optimization method according to the first embodiment of the preset disclosure.

Reference is made to FIGS. 1 and 2, in which FIG. 1 is a block diagram of an image fusion device according to a first embodiment of the preset disclosure, and FIG. 2 is a flowchart diagram of an image fusion parallel optimization method according to the first embodiment of the preset disclosure.

An image fusion device 1001 of the first embodiment of the preset disclosure is applicable to fuse a plurality of images of a scene (such as a same body part of a human body) captured by a medical device (such as an endoscope) or other devices (under different lights) to generate a fusion image IMC that is clear and similar to the scene thereof.

As shown in FIG. 1, the image fusion device 1001 of the first embodiment of the preset disclosure may include an image feature analyzing component 90, an image color identifying component 10, a maximum depth comparing component 20, a pixel depth analyzing component 30 and an image fusion processing component 40. Steps S91, S93 and S101 to S115 that are included in the image fusion parallel optimization method as shown in FIG. 2 are performed (by the image fusion device 1001 of the first embodiment of the preset disclosure as shown in FIG. 1).

The image feature analyzing component 90 may be connected to the image color identifying component 10. The image color identifying component 10 may be connected to the maximum depth comparing component 20. The pixel depth analyzing component 30 may be connected to the maximum depth comparing component 20 and the image fusion processing component 40.

After the plurality of images are aligned with each other to form a superimposed image IMA, the image feature analyzing component 90 obtains the superimposed image IMA (in step S91) and then converts the superimposed image IMA into a feature image IMF (in step S93). For example, the image feature analyzing component 90 analyzes a plurality of features of the superimposed image IMA and accordingly converts the superimposed image IMA into the feature image IMF (in step S93).

It is worth noting that, in the embodiment, the plurality of images of the scene (such as the same body part of the human body) are captured respectively under different colored light beams (by the medical device), and then aligned with each other to form the superimposed image IMA obtained by the image feature analyzing component 90.

It should be understood that, the number of the plurality of images captured by the medical device (such as the endoscope) or other devices, the number of the plurality of images aligned with each other, and the area and the number of the plurality of pixel regions divided from the feature image IMF, may be determined according to actual requirements, but the present disclosure is not limited thereto.

The image color identifying component 10 reads the feature image IMF from the image feature analyzing component 90, and identifies colors of a plurality of pixel points in a plurality of pixel regions of the feature image IMF (in step S101).

The maximum depth comparing component 20 compares color depths of the plurality of pixel points in each of the plurality of pixel regions of the feature image IMF with each other (in step S103). The maximum depth comparing component 20 determines a largest one of the color depths of the plurality of pixel points that are classified in a same one of a plurality of color tones in each of the plurality of pixel regions, as a maximum color depth of the same one of the plurality of color tones in each of the plurality of pixel regions of the feature image IMF (in step S105).

For example, the maximum depth comparing component 20 determines the maximum color depths respectively of the plurality of color tones in each of the plurality of pixel regions of the feature image IMF, such as, but not limited to a maximum color depth of a red tone, a maximum color depth of a blue tone and a maximum color depth of a green tone, but the present disclosure is not limited thereto.

The pixel depth analyzing component 30 analyzes a relationship between the color depth of each of the plurality of pixel points and the maximum color depth that are classified in the same one of the plurality of color tones in each of the plurality of pixel regions of the feature image IMF (in step S107).

The image fusion processing component 40 determines whether or not the relationship between the color depth of each of the plurality of pixel points and the maximum color depth that are classified in the same one of the plurality of color tones in each of the plurality of pixel regions of the feature image IMF meets a preset relationship (in step S109) to determine whether or not to adjust the color depth of each of the plurality of pixel points of the feature image IMF.

When the image fusion processing component 40 determines that the relationship between the color depth of any one of the plurality of pixel points and the maximum color depth that are classified in the same one of the plurality of color tones in the same one of the plurality of pixel regions of the feature image IMF meets the preset relationship, the image fusion processing component 40 does not adjust the color depth of the one of the plurality of pixel points. If others of the plurality of pixel regions of the feature image IMF are not processed (in step S113), the image fusion processing component 40 performs the same processes on the others of the plurality of pixel regions of the feature image IMF as that of the one of the plurality of pixel points (in steps S103 to S111, or steps S103 to S107 and S109).

Conversely, when the image fusion processing component 40 determines that the relationship between the color depth of any one of the plurality of pixel points and the maximum color depth that are classified in the same one of the plurality of color tones in the same one of the plurality of pixel regions of the feature image IMF does not meet the preset relationship, the image fusion processing component 40 adjusts the color depth of the one of the plurality of pixel points according to the maximum color depth (in step S111). For example, the image fusion processing component 40 may fuse the color depth of the one of the plurality of pixel points and the maximum color depth that is classified in the same one of the plurality of color tones with the color depth of the one of the plurality of pixel points in the same one of the plurality of pixel regions of the feature image IMF.

For example, when the image fusion processing component 40 determines that a color difference between the color depth of any one of the plurality of pixel points and the maximum color depth that are classified in the same one of the plurality of color tones in the same one of the plurality of pixel regions of the feature image IMF is larger than a color difference threshold (that is the preset relationship as described above), the image fusion processing component 40 adjusts the color depth of the one of the plurality of pixel points according to the maximum color depth.

After all of the plurality of pixel points in the plurality of pixel regions of the feature image IMF are processed (in step S113), the image fusion processing component 40 generates the fusion image IMC according to the adjusted/fused feature image IMF (in step S115).

Figure 3:
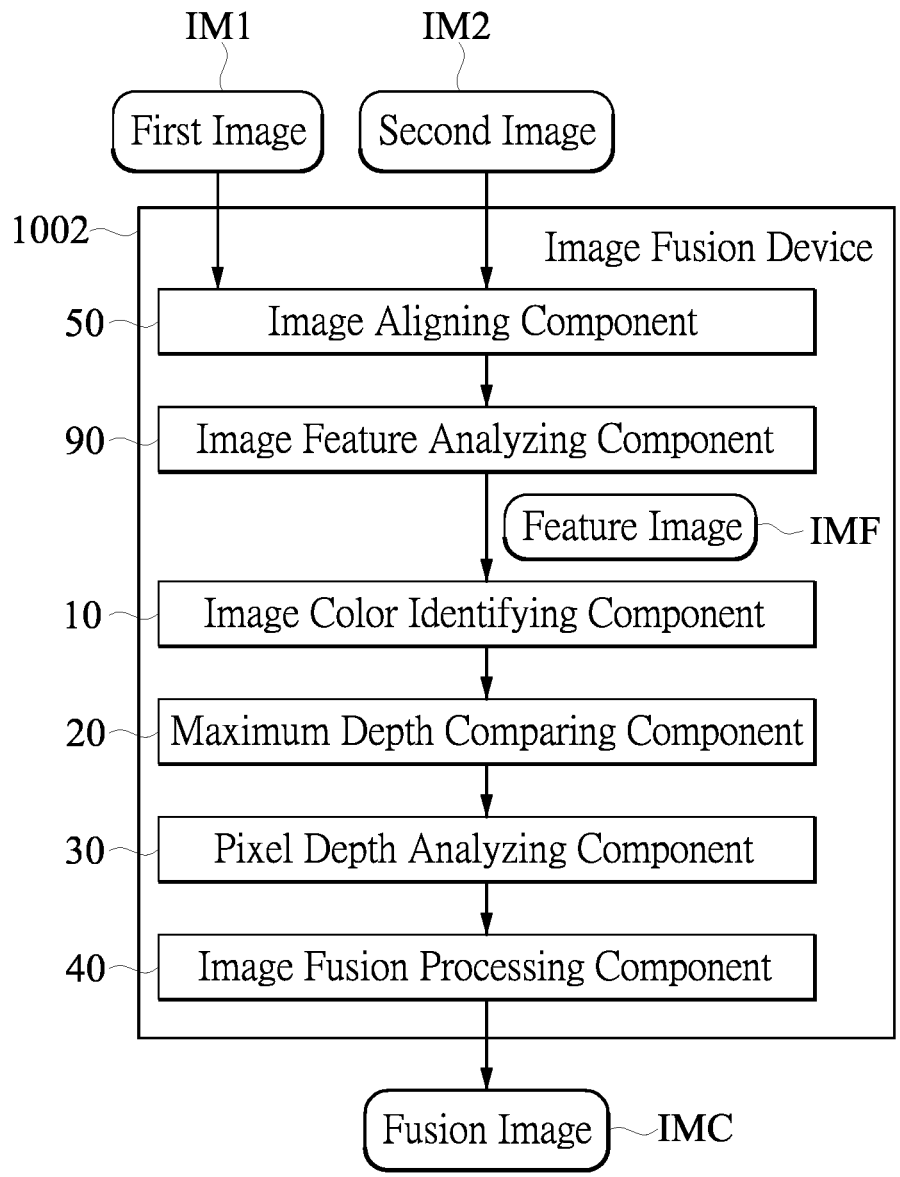
FIG. 3 is a block diagram of an image fusion device according to a second embodiment of the preset disclosure.

Reference is made to FIG. 3, which is a block diagram of an image fusion device according to a second embodiment of the preset disclosure. The same descriptions of the second and first embodiments of the preset disclosure are not repeated herein.

A difference between the second and first embodiments of the preset disclosure is that, an image fusion device 1002 of the second embodiment of the preset disclosure not only includes the image feature analyzing component 90, the image color identifying component 10, the maximum depth comparing component 20, the pixel depth analyzing component 30 and the image fusion processing component 40, but also includes an image aligning component 50.

The image aligning component 50 may be connected to the image color identifying component 10.

When the plurality of images (such as a first image IM1 and a second image IM2 as shown in FIG. 3) received by the image fusion device 1002 of the second embodiment of the preset disclosure are not aligned with each other yet, the image aligning component 50 of the image fusion device 1002 of the preset disclosure may align the plurality of images with each other to form a superimposed image.

For example, the first image IM1 is captured under a green light G and a blue light B, the second image IM2 is captured under a white light formed from a red light R mixed with the green light G and the blue light B, and then the first image IM1 and the second image IM2 are aligned with each other to form the superimposed image, but the present disclosure is not limited thereto.

Figure 4:
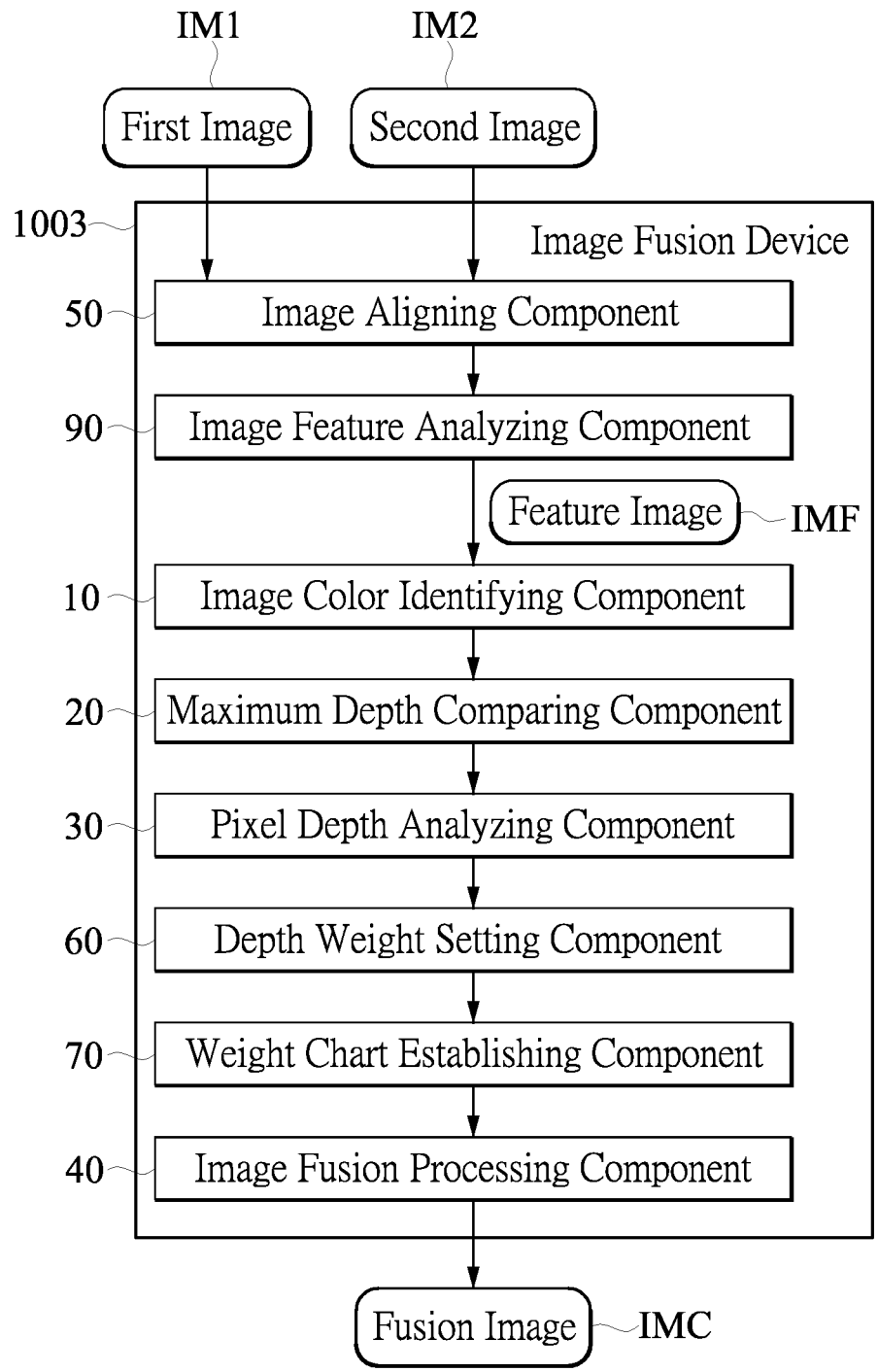
FIG. 4 is a block diagram of an image fusion device according to third and fourth embodiments of the preset disclosure.
Figure 5:
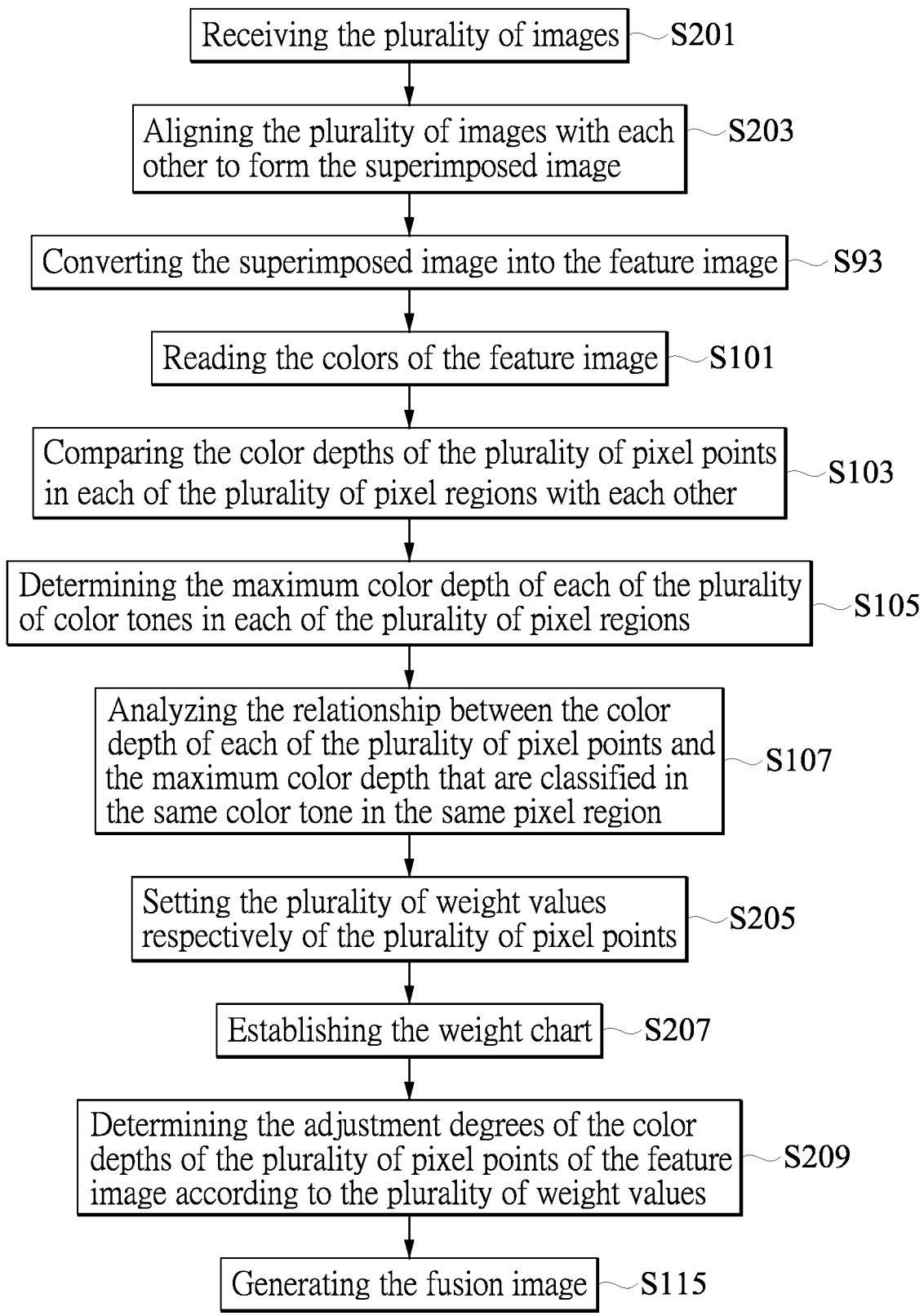
FIG. 5 is a flowchart diagram of an image fusion parallel optimization method according to the third embodiment of the preset disclosure.

Reference is made to FIGS. 4 and 5, in which FIG. 4 is a block diagram of an image fusion device according to third and fourth embodiments of the preset disclosure, and FIG. 5 is a flowchart diagram of an image fusion parallel optimization method according to the third embodiment of the preset disclosure.

The same descriptions of the first to third embodiments of the preset disclosure are not repeated herein.

A difference between the third and second embodiments of the preset disclosure is that, an image fusion device 1003 of the third embodiment of the preset disclosure not only includes the image feature analyzing component 90, the image color identifying component 10, the maximum depth comparing component 20, the pixel depth analyzing component 30, the image fusion processing component 40 and the image aligning component 50, but also includes a depth weight setting component 60 and a weight chart establishing component 70 as shown in FIG. 4.

The depth weight setting component 60 may be connected to the pixel depth analyzing component 30 and the weight chart establishing component 70. The weight chart establishing component 70 may be connected to the image fusion processing component 40. In practice, the weight chart establishing component 70 may be omitted.

The image fusion device 1003 of the third embodiment of the preset disclosure as shown in FIG. 4 may perform steps S93, S101 to S107, S115 and steps S201 to S209 that are included in the image fusion parallel optimization method as shown in FIG. 5, but the present disclosure is not limited thereto. In practice, the steps of the image fusion method of the preset disclosure may be adjusted or omitted according to actual requirements.

The image aligning component 50 receives the plurality of images including the first image IM1 and the second image IM2 as shown in FIG. 4 from an external device (in step S201), and assigns the plurality of images with each other to form the superimposed image (in step S203).

The image feature analyzing component 90 converts the superimposed image into the feature image IMF (in step S93). For example, the image feature analyzing component 90 analyzes the plurality of features of the superimposed image and accordingly converts the superimposed image into the feature image IMF (in step S93).

The image color identifying component 10 reads the feature image IMF and identifies the colors of the plurality of pixel points in the plurality of pixel regions of the feature image IMF (in step S101).

The maximum depth comparing component 20 compares the color depths of the plurality of pixel points in each of the plurality of pixel regions of the feature image IMF with each other (in step S103). The maximum depth comparing component 20 determines the largest one of the color depths of the plurality of pixel points that are classified in the same one of the plurality of color tones in each of the plurality of pixel regions of the feature image IMF, as the maximum color depth of the same one of the plurality of color tones in each of the plurality of pixel regions of the feature image IMF (in step S105).

The pixel depth analyzing component 30 analyzes and determines the relationship between the color depth of each of the plurality of pixel points and the maximum color depth that are classified in the same one of the plurality of color tones in each of the plurality of pixel regions of the feature image IMF (in step S107).

It is worth noting that, the depth weight setting component 60 sets a plurality of weight values according to difference relationships between the color depths of the plurality of pixel points and the maximum color depths that respectively are classified in the plurality of color tones in each of the plurality of pixel regions of the feature image IMF (in step S205).

If necessary, the weight chart establishing component 70 may establish a weight chart of the feature image IMF according to the plurality of weight values respectively of the plurality of pixel points of the feature image IMF (in step S207).

The image fusion processing component 40 determines adjustment degrees of the color depths of the plurality of pixel points of the feature image IMF according to the plurality of weight values respectively of the plurality of pixel points (on the weight chart) (in step S209).

After the image fusion processing component 40 adjusts the color depths of some of the plurality of pixel points of the feature image respectively according to the plurality of weight values of the plurality of pixel points (on the weight chart), the image fusion processing component 40 generates the fusion image IMC according to the adjusted feature image (in step S115).

Figure 6:
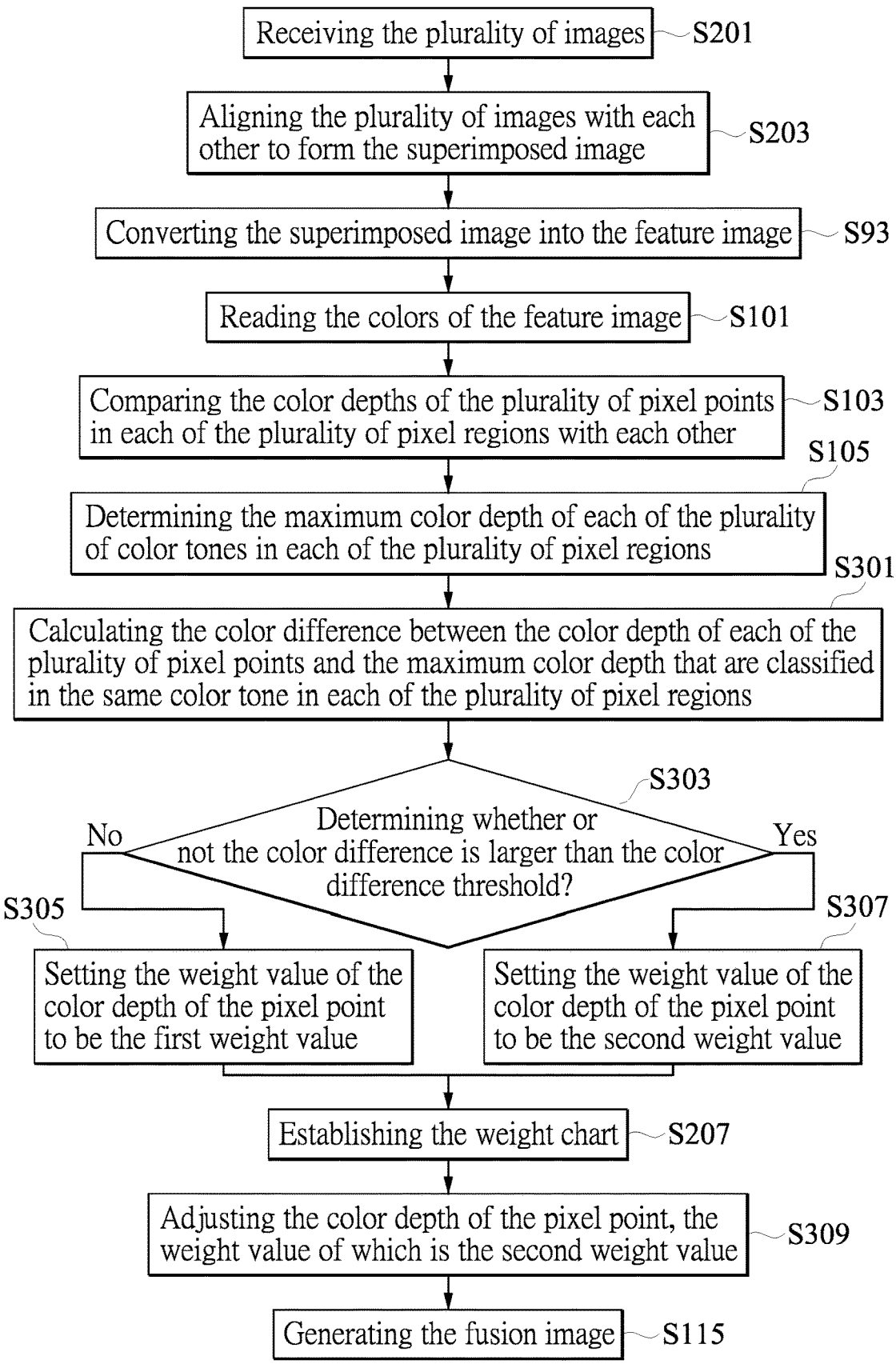
FIG. 6 is a flowchart diagram of an image fusion parallel optimization method according to the fourth embodiment of the preset disclosure.

Reference is made to FIGS. 4 and 6, in which FIG. 4 is a block diagram of an image fusion device according to third and fourth embodiments of the preset disclosure, and FIG. 6 is a flowchart diagram of an image fusion parallel optimization method according to the fourth embodiment of the preset disclosure.

A difference between the second and fourth embodiments of the preset disclosure is that, the image fusion device 1003 of the fourth embodiment of the preset disclosure not only includes the image feature analyzing component 90, the image color identifying component 10, the maximum depth comparing component 20, the pixel depth analyzing component 30, the image fusion processing component 40 and the image aligning component 50, but also includes the depth weight setting component 60 and the weight chart establishing component 70 as shown in FIG. 4.

The depth weight setting component 60 may be connected to the pixel depth analyzing component 30 and the weight chart establishing component 70. The weight chart establishing component 70 may be connected to the image fusion processing component 40. In practice, the weight chart establishing component 70 may be omitted.

The image fusion device 1003 of the third embodiment of the preset disclosure as shown in FIG. 4 may perform steps S93, S101 to S105, S115, S201 to S203, S207 and S301 to S309 that are included in the image fusion parallel optimization method as shown in FIG. 6. In practice, the steps of the image fusion method of the preset disclosure may be adjusted or omitted according to actual requirements.

The image aligning component 50 receives the plurality of images including the first image IM1 and the second image IM2 as shown in FIG. 4 from the external device (in step S201), and assigns the plurality of images with each other to form the superimposed image (in step S203).

The image feature analyzing component 90 converts the superimposed image into the feature image IMF (in step S93). For example, the image feature analyzing component 90 analyzes the plurality of features of the superimposed image and accordingly converts the superimposed image into the feature image IMF (in step S93).

The image color identifying component 10 reads the feature image IMF and identifies the colors of the plurality of pixel points in the plurality of pixel regions of the feature image IMF (in step S101).

The maximum depth comparing component 20 compares the color depths of the plurality of pixel points in each of the plurality of pixel regions of the feature image IMF with each other (in step S103). The maximum depth comparing component 20 determines the largest one of the color depths of the plurality of pixel points that are classified in the same one of the plurality of color tones in each of the plurality of pixel regions, as the maximum color depth of the same one of the plurality of color tones in each of the plurality of pixel regions of the feature image IMF (in step S105).

The pixel depth analyzing component 30 calculates the color difference between the color depth of each of the plurality of pixel points and the maximum color depth that are classified in the same one of the plurality of color tones in each of the plurality of pixel regions of the feature image IMF (in step S301).

The pixel depth analyzing component 30 determines whether or not the color difference between the color depth of each of the plurality of pixel points and the maximum color depth that are classified in the same one of the plurality of color tones in the same one of the plurality of pixel regions of the feature image IMF is larger than the color difference threshold (in step S303).

If the pixel depth analyzing component 30 determines that the color difference between the color depth of any one of the plurality of pixel points and the maximum color depth that are classified in the same one of the plurality of color tones in the same one of the plurality of pixel regions of the feature image IMF is not larger than the color difference threshold, the image fusion processing component 40 sets the weight value of the one of the plurality of pixel points to be a first weight value such as, but not limited to "1" (in step S305).

Conversely, if the pixel depth analyzing component 30 determines that the color difference between the color depth of each of the plurality of pixel points and the maximum color depth that are classified in the same one of the plurality of color tones in the same one of the plurality of pixel regions of the feature image IMF is larger than the color difference threshold, the image fusion processing component 40 sets the weight value of the one of the plurality of pixel points to be a second weight value such as, but not limited to "0" (in step S307).

If necessary, the weight chart establishing component 70 may establish the weight chart of the feature image IMF according to the plurality of weight values respectively of the plurality of pixel points of the feature image IMF (in step S207).

If the weight value of the color depth of any one of the plurality of pixel points of the feature image IMF is equal to the second weight value (on the weight chart), the image fusion processing component 40 adjusts the color depth of the one of the plurality of pixel points according to the maximum color depth that is classified in the same one of the plurality of color tones with the color depth of the one of the plurality of pixel points in the same one of the plurality of pixel regions of the feature image IMF (in step S309). Conversely, if the weight value of the color depth of any one of the plurality of pixel points of the feature image IMF is equal to the first weight value (on the weight chart), the image fusion processing component 40 does not adjust the color depth of the one of the plurality of pixel points. Finally, the image fusion processing component 40 generates the fusion image IMC according to the adjusted feature image IMF (in step S115).

Figure 7:
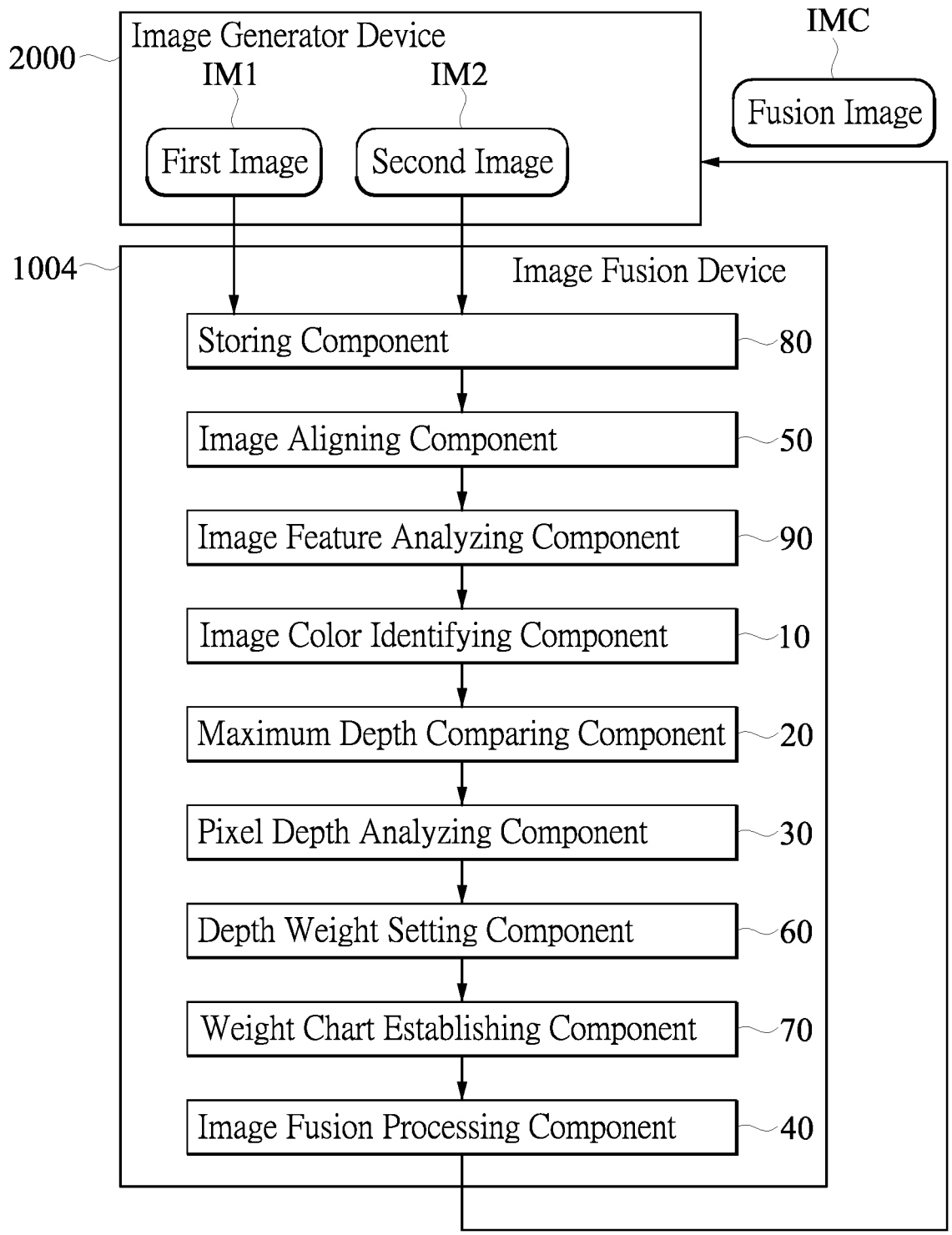
FIG. 7 is a block diagram of an image fusion device according to a fifth embodiment of the preset disclosure.

Reference is made to FIG. 7, which is a block diagram of an image fusion device according to a fifth embodiment of the preset disclosure. The same descriptions of the first to fifth embodiments of the preset disclosure are not repeated herein.

A difference between the fifth and fourth embodiments of the preset disclosure is that, an image fusion device 1004 of the fifth embodiment of the preset disclosure not only includes the image feature analyzing component 90, the image color identifying component 10, the maximum depth comparing component 20, the pixel depth analyzing component 30, the image fusion processing component 40, the image aligning component 50, the depth weight setting component 60 and the weight chart establishing component 70, but also includes a storing component 80 as shown in FIG. 7, but the present disclosure is not limited thereto.

The storing component 80 of the image fusion device 1004 (such as a graphic processor) of the fifth embodiment of the preset disclosure may be connected to an image generator device 2000 (such as a central processor). The storing component 80 stores the plurality of images from the image generator device 2000 (such as the central processor). For example, the plurality of images stored in the storing component 80 may include the first image IM1 (that is captured under the green light G and the blue light B) and the second image IM2 (that is captured under the white light formed from the red light R mixed with the green light G and the blue light B).

The image aligning component 50 of the image fusion device 1004 may be connected to the storing component 80. The image aligning component 50 assigns the plurality of images (including the first image IM1 and the second image IM2) stored in the storing component 80 with each other to form the superimposed image.

Figure 8:
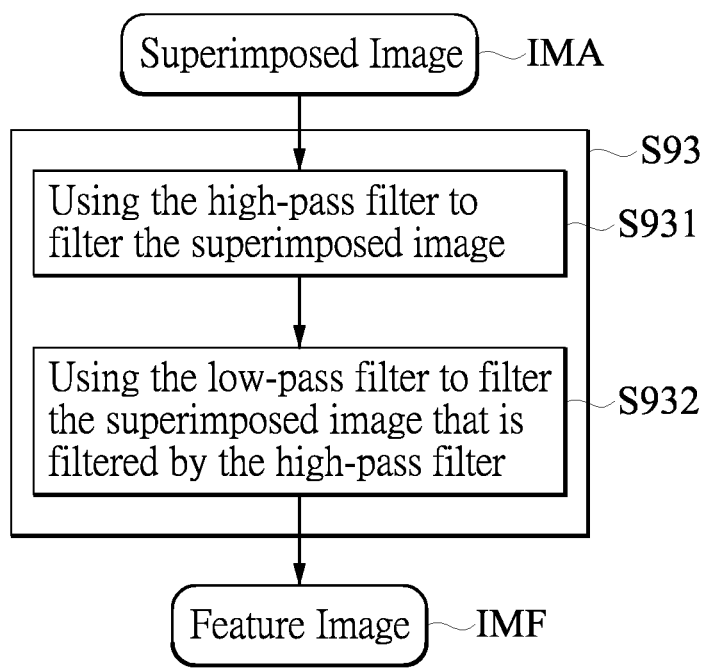
FIG. 8 is a flowchart diagram of an image fusion parallel optimization method according to a sixth embodiment of the preset disclosure.

Reference is made to FIG. 8, which is a flowchart diagram of an image fusion parallel optimization method according to a sixth embodiment of the preset disclosure.

In the image fusion method of the sixth embodiment of the preset disclosure, the step (for example, S93 as shown in FIGS. 2, 5 and 6) of converting the superimposed image into the feature image includes steps S931 and S932 as shown in FIG. 8. The steps S931 and S932 may be performed by an image feature analyzing component (such as the image feature analyzing component 90 as shown in FIGS. 1, 3, 4 and 7) of the image fusion device of the preset disclosure.

The image feature analyzing component obtains an input image (that is the superimposed image IMA described above), and then removes a background color from the input image to generate a foreground image as a subsequent comparison image (that is the feature image IMF described above).

For example, the image feature analyzing component may include a high-pass filter and a low-pass filter. The high-pass filter filters the superimposed image IMA (in step S931). Then, the low-pass filter filters the superimposed image IMA that is filtered by the high-pass filter to generate the feature image IMF (in step S932).

In conclusion, the present disclosure provides the image fusion device and the image fusion parallel optimization method. In the image fusion parallel optimization method of the present disclosure, the image fusion device of the present disclosure fuses the plurality of images of the scene such as the same body part of the human body that are captured under different lights to generate the clear image that is similar to the scene. As a result, practicability of the image is more effectively improved for subsequent applications, for example, an accuracy of medical diagnosis applications.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:
1. An image fusion device,
   a graphic processor configured to:

convert a superimposed image into a feature image after a plurality of images of a same scene are captured respectively under different colored light beams and then aligned with each other to form the superimposed image;

read and identify colors of a plurality of pixel points in a plurality of pixel regions of the feature image;

compare color depths of the plurality of pixel points in each of the plurality of pixel regions of the feature image with each other;

determine a largest one of the color depths of the plurality of pixel points that are classified in a same one of a plurality of color tones in each of the plurality of pixel regions, as a maximum color depth of the same one of the plurality of color tones in each of the plurality of pixel regions of the feature image;

analyze a relationship between the color depth of each of the plurality of pixel points and the maximum color depth that are classified in the same one of the plurality of color tones in each of the plurality of pixel regions of the feature image; and determine whether or not to adjust the color depth of each of the plurality of pixel points of the feature image, according to the relationship between the color depth of each of the plurality of pixel points and the maximum color depth that are classified in the same one of the plurality of color tones in each of the plurality of pixel regions of the feature image;

wherein, when the relationship between the color depth of any one of the plurality of pixel points and the maximum color depth that are classified in the same one of the plurality of color tones in a same one of the plurality of pixel regions of the feature image does not meet a preset relationship, the graphic processor adjusts the color depth of the one of the plurality of pixel points according to the maximum color depth, and graphic processor generates the fusion image according to the feature image on which all of the plurality of pixel regions are adjusted.

2. The image fusion device according to claim 1, wherein the graphic processor is configured to store the plurality of images and align the plurality of images with each other to form the superimposed image.

3. The image fusion device according to claim 1, wherein the graphic processor analyzes a plurality of features of the superimposed image and accordingly converts the superimposed image into the feature image.

4. The image fusion device according to claim 1, wherein, when a color difference between the color depth of any one of the plurality of pixel points and the maximum color depth that are classified in the same one of the plurality of color tones in the same one of the plurality of pixel regions of the feature image is larger than a color difference threshold, the graphic processor adjusts the color depth of the one of the plurality of pixel points according to the maximum color depth.

5. The image fusion device according to claim 1, wherein the graphic processor is configured to:
set a plurality of weight values according to the relationships between the color depths of the plurality of pixel points and the maximum color depths that are classified in the plurality of color tones in each of the plurality of pixel regions of the feature image; and
determine adjustment degrees of the color depths of the plurality of pixel points of the feature image according to the plurality of weight values of the plurality of pixel points of the feature image, respectively.

6. The image fusion device according to claim 5, wherein the plurality of weight values include a first weight value and a second weight value;
wherein, when a color difference between the color depth of any one of the plurality of pixel points and the maximum color depth that are classified in the same one of the plurality of color tones in the same one of the plurality of pixel regions of the feature image is larger than a color difference threshold, the graphic processor sets a weight value of the color depth of the one of the plurality of pixel points to be the second weight value, and graphic processor adjusts the one of the plurality of pixel points to which the second weight value is set according to the maximum color depth;
wherein, when the color difference between the color depth of any one of the plurality of pixel points and the maximum color depth that are classified in the same one of the plurality of color tones in the same one of the plurality of pixel regions of the feature image is not larger than the color difference threshold, the graphic processor sets the weight value of the color depth of the one of the plurality of pixel points to be the first weight value, and graphic processor does not adjust the one of the plurality of pixel points to which the first weight value is set.

7. The image fusion device according to claim 6, wherein the graphic processor is configured to:
establish a weight chart of the feature image according to the plurality of weight values of the plurality of pixel points of the feature image; and
determine the adjustment degrees of the color depths of the plurality of pixel points of the feature image according to the plurality of weight values on the weight chart.

8. An image fusion parallel optimization method, comprising the following steps:
obtaining a superimposed image, wherein a plurality of images of a same scene are captured respectively under different colored light beams and then aligned with each other to form the superimposed image;
converting the superimposed image into a feature image;
reading and identifying colors of a plurality of pixel points in a plurality of pixel regions of the feature image;
comparing color depths of the plurality of pixel points in each of the plurality of pixel regions of the feature image with each other;
determining a largest one of the color depths of the plurality of pixel points that are classified in a same one of a plurality of color tones in each of the plurality of pixel regions, as a maximum color depth of the same one of the plurality of color tones in each of the plurality of pixel regions of the feature image;
analyzing a relationship between the color depth of each of the plurality of pixel points and the maximum color depth that are classified in the same one of the plurality of color tones in each of the plurality of pixel regions of the feature image;
determining whether or not to adjust the color depth of each of the plurality of pixel points of the feature image, according to the relationship between the color depth of each of the plurality of pixel points and the maximum color depth that are classified in the same one of the plurality of color tones in each of the plurality of pixel regions of the feature image;
determining whether or not the relationship between the color depth of any one of the plurality of pixel points and the maximum color depth that are classified in the same one of the plurality of color tones in a same one of the plurality of pixel regions of the feature image meets a preset relationship; in response to determining that the relationship meets the preset relationship, not adjusting the color depth of the one of the plurality of pixel points, and in response to determining that the relationship does not meet the preset relationship, adjusting the color depth of the one of the plurality of pixel points according to the maximum color depth that is classified in the same one of the plurality of color tones with the color depth of the one of the plurality of pixel points in the same one of the plurality of pixel regions, and then generating the fusion image according to the feature image on which the color depths of all of the plurality of pixel regions are adjusted; and determining whether or not a color difference between the color depth of any one of the plurality of pixel points and the maximum color depth that are classified in the same one of the plurality of color tones in the same one of the plurality of pixel regions of the feature image is larger than a color difference threshold, in responding to determining that that the color difference is not larger than the color difference threshold, setting the weight value of the color depth of the one of the plurality of pixel points to be a first weight value and not adjusting the one of the plurality of pixel points to which the first weight value is set, and in responding to determining that the color difference is larger than the color difference threshold, setting a weight value of the color depth of the one of the plurality of pixel points to be a second weight value and adjusting the one of the plurality of pixel points to which the second weight value is set according to the maximum color depth.

* * * * *